Nov. 16, 1937.  J. C. WOODFORD  2,099,644
LIQUID DISPENSING APPARATUS
Filed Nov. 22, 1934    4 Sheets-Sheet 3
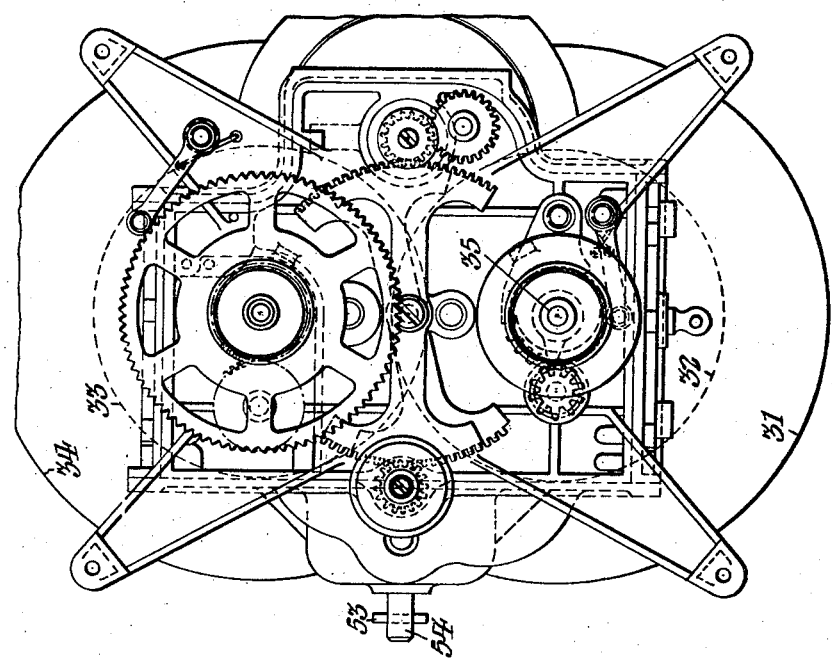
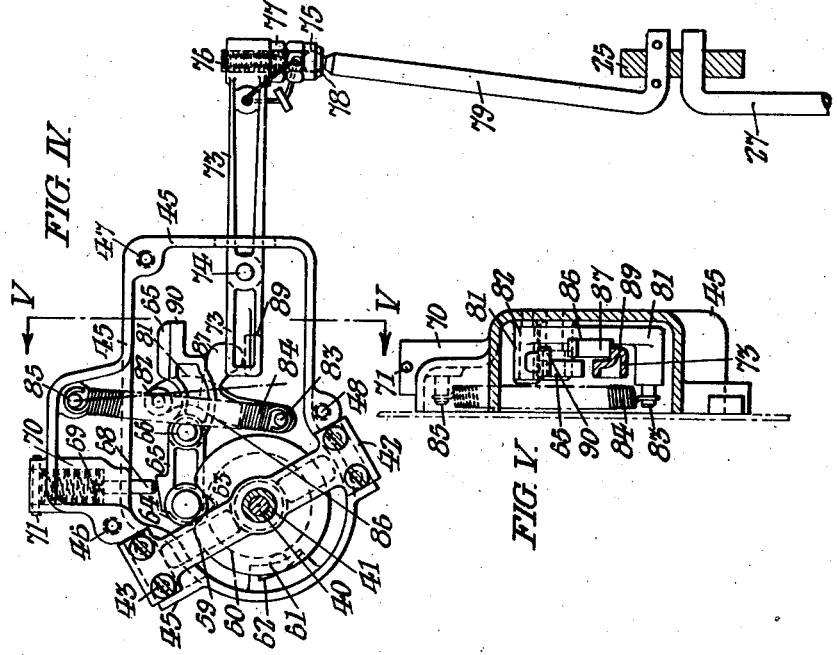
INVENTOR:
JOSEPH C. WOODFORD,
BY

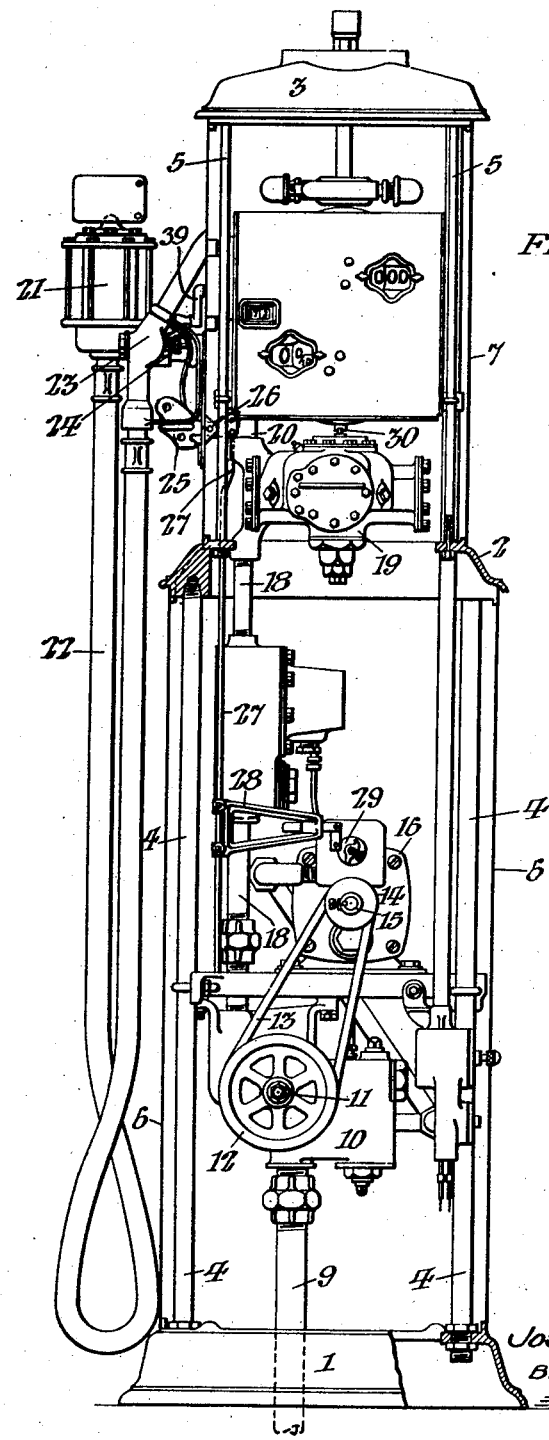

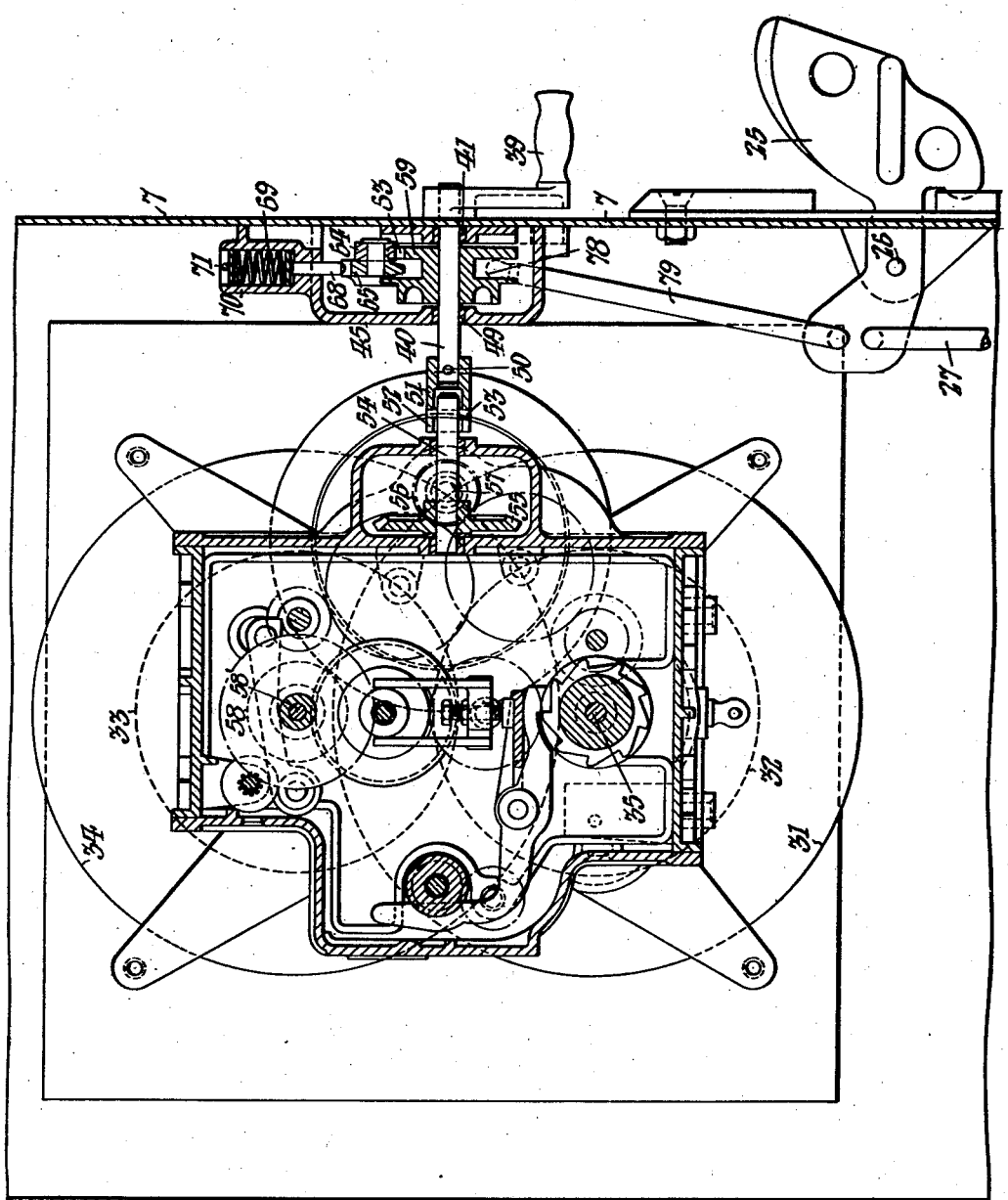
FIG. II.

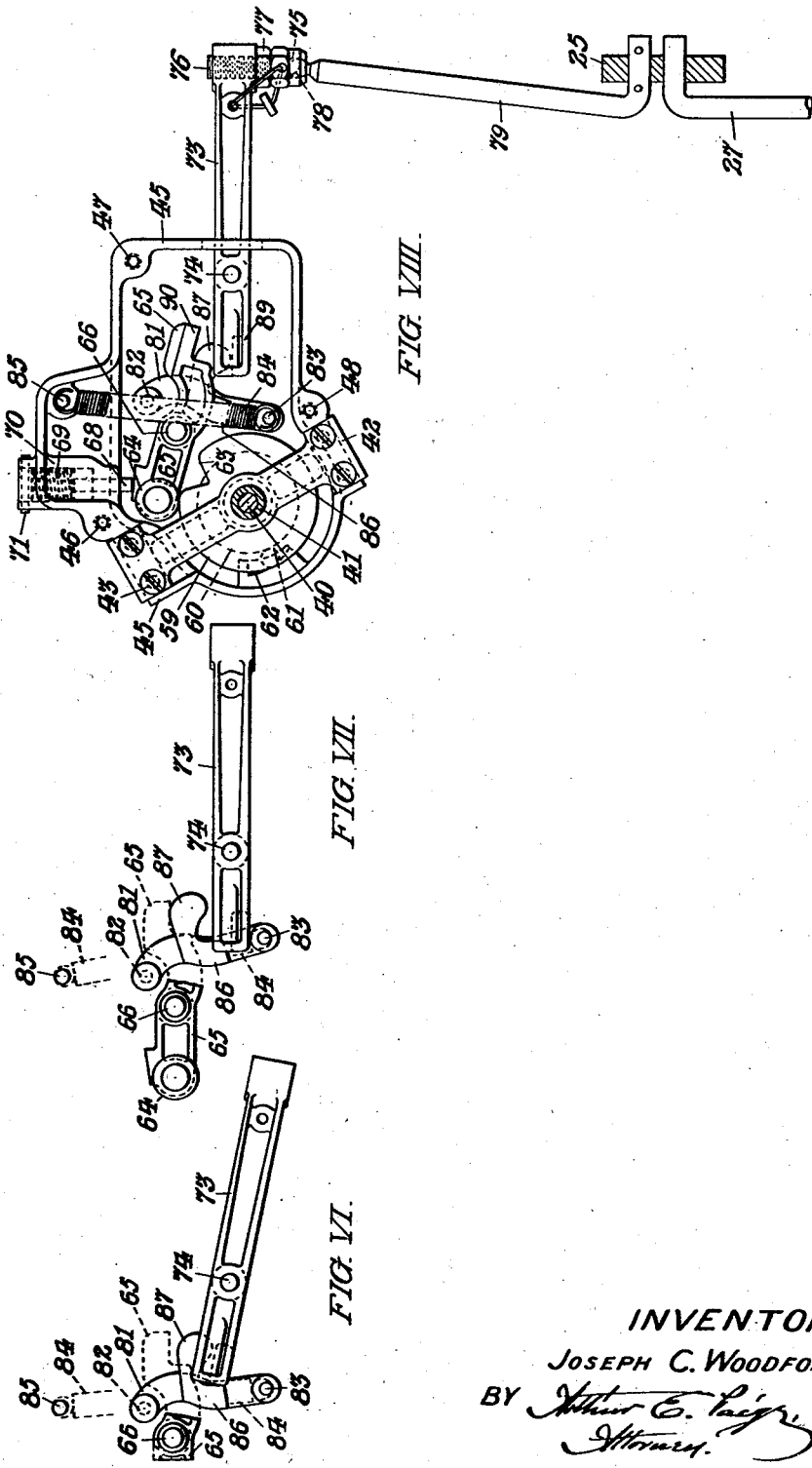

Patented Nov. 16, 1937

2,099,644

UNITED STATES PATENT OFFICE 2,099,644

LIQUID DISPENSING APPARATUS

Joseph C. Woodford, Haverford, Pa., assignor to John Wood Manufacturing Company, Inc., Conshohocken, Pa., a corporation of Delaware Application November 22, 1934, Serial No. 754,201

3 Claims. (Cl. 221—95)

This invention is particularly applicable to apparatus of what is known as the metering pump type, including a meter through which gasolene or other liquid is forced by a pump to and through a flexible dispensing hose having at the end thereof a nozzle provided with a valve for control by the dispensing operator; said pump being operable by an electric motor. Said meter is operatively connected with registering mechanism indicating the volume of liquid dispensed, in gallons and fractions of a gallon, conveniently including rotary dials, one of which makes a complete revolution with reference to an index mark for each gallon dispensed and the other of which is moved angularly from one gallon indication to the next by each revolution of the first dial aforesaid. Such apparatus includes what is known as a "set-back" mechanism by which the operator may restore the dials to zero position between successive dispensing operations, but is not, ordinarily, provided with any means for insuring that the operator shall return the indicating mechanism to zero position after one dispensing operation before beginning the next. Consequently, a careless or felonious operator may cheat the customer by failing to return the indicating mechanism all the way to zero position between dispensing operations. For instance, the indicating mechanism may be returned to the one gallon mark instead of to the zero mark and with the effect that the next customer gets one less gallon than appears by the indicating mechanism to have been dispensed at that transaction.

Such fraudulent manipulation of the apparatus is in fact facilitated by the usual construction thereof including an electric switch for starting and stopping said electric motor which is operable by manipulation of the hose to and from its normal idle position of rest upon its support projecting from the casing of the apparatus. Therefore, the purpose and effect of my invention is to deprive the operator of any opportunity to fraudulently manipulate the mechanism indicating the volume dispensed by means which, upon initial movement of the set-back mechanism, renders said electric motor inoperative unless and until the indicating mechanism is in fact restored to its initial zero position. In other words, whereas in ordinary liquid dispensing apparatus the indicating mechanism may be manipulated by the operator independently of the dispensing apparatus, my invention provides means for establishing an interlocking relation between the liquid dispensing apparatus and the means indicating the volume of liquid dispensed efficient to prevent such fraudulent manipulation of the indicating mechanism.

My invention includes the various novel features of construction and arrangement hereinafter more definitely specified. The computing registering mechanism incidentally shown is the subject matter of my copending application Serial No. 750,805 filed October 31, 1934, for Letters Patent of the United States.

In said drawings, Fig. I is an elevation of a liquid dispensing apparatus, of the curbstand type, conveniently embodying my invention. Fig. II is a fragmentary vertical sectional view of said dispensing apparatus taken on a plane parallel with the front of Fig. I on the axis of rotation of the crank handle of the set-back mechanism shown in Fig. I. Fig. III is a rear elevation of the computing registering mechanism with the rear dials removed but indicating the means for connecting them with the front dials. Fig. IV is an elevation, partly in section, showing said switch locking mechanism as seen from the left hand side of Fig. I and the right hand side of Fig. II. Fig. V is a sectional view taken on the line V, V in Fig. IV in the direction of the arrows on said line. Fig. VI is an elevation of the locking linkage shown in Fig. IV; in the position to which it is shifted by closing movement of the motor switch. Fig. VII is an elevation of said linkage in the position it assumes under stress of the spring when the switch is moved to open position; in which position said linkage prevents movement of the switch to closed position until the indicating mechanism has been reset to zero position. Fig. VIII is an elevation similar to Fig. IV but showing the locking mechanism shifted by initial turning movement of the resetting crank; so as to prevent closing movement of said switch until the indicating mechanism is reset to zero position.

Referring to Fig. I; the liquid dispensing apparatus is principally contained in the housing which is adapted to be rigidly mounted upon a pavement or a platform at a curb or driveway and includes three transversely extending cast metal frame members, viz., the base member 1, the intermediate member 2, and the top member 3. Said frame members 1, 2, and 3 are rigidly connected in the vertical relation shown by a columnar frame including standards 4 connecting the frame member 1 with the frame member 2 and the standards 5 connecting the frame member 2 with the frame member 3. Said housing includes the two casing sections 6 and 7 which are rectangular tubes with rounded corners; said section 6 extending between said frame members 1 and 2 and said section 7 extending between said frame members 2 and 3.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the armature shaft 15 of the electric motor 16. The liquid is discharged from said pump 10 through the conduit 18 into the flow meter 19 from which it is discharged through the conduit 20 and sight gage 21 into the flexible dispensing hose 22 which is provided at its free end with the nozzle 23 including the valve 24 which is normally closed but may be opened by the dispensing operator. The hook lever 25, which is fulcrumed at 26 on said casing section 7, is provided to support the hose nozzle in idle position, the outer end of said lever being then depressed by the weight of the hose and nozzle. The inner end of said lever 25 is pivotally connected with the vertically reciprocatory rod 27 which carries the bracket 28 for operating the electric switch 29. The arrangement is such that when the outer end of said lever 25 is lowered, as shown, said switch 29 is opened to deenergize the motor 16 and stop the operation of said pump 10, but, when said lever 25 is raised, said switch is closed to operate said pump.

Said flow meter 19 includes a rotor which is turned by the passage of liquid therethrough from the conduit 18 to the conduit 20, and has the shaft 30 which makes one revolution for each gallon of liquid passed through said meter 19. That shaft is operatively connected with registering mechanism including the rotary dials 31 and 32 respectively indicating the number of gallons and fractions of a gallon dispensed, and dials 33 and 34 respectively indicating the value of the volume dispensed in dollars and cents. Said dial 32 is mounted on the shaft 35 so as to make one revolution for each gallon dispensed, but said dial 31 is only moved the angular distance from one graduation to the next on that dial at each revolution of the dial 32; so that the number of gallons and fractions of gallons dispensed are thus registered. Such computing and registering mechanism is the subject matter of my copending application for Letters Patent of the United States Serial No. 750,805 filed October 31, 1934, and is not herein claimed.

Said indicating mechanism is arranged to be set back to zero by clockwise manual rotation of the crank 39 which is operatively connected with the set-back shaft 40 extending through the side of said casing section 7. Said shaft 40 is journaled at its outer end in the bearing 41 in the cross bar 42 which is detachably rigidly connected, conveniently by the screws 43, with the lock casing 45. Said lock casing is conveniently rigidly connected with the casing 7 by three screws 46, 47, and 48 extending through lugs on said casing 45. The inner end of said set-back shaft 40 is journaled in the bearing 49 in said casing 45 and provided with the cross pin 50 engaging the slightly loose coupling 51 which has the slot 52 engaging the cross pin 53 on the indicator shaft 54 which carries the bevel gear 55 which is suitably connected with said shaft 35 of said dial 32, by means, shown in Fig. II, including the bevel gear 56 in mesh with said bevel gear 55 and carried by the shaft 57; and the friction clutch 58 on the shaft 58', which permits the dials to be set back to zero position, by manual rotation of said crank 39, while the other mechanism is held stationary by its connection with the meter.

Said set-back shaft 40 has rigidly connected therewith the cam 59 having the cylindrical hub 60, and the latter engages the clutch roller 61 which is seated in the evolutely inclined recess 62 in said lock casing 45. That construction and arrangement are such that said shaft 40 may only be turned clockwise, which is the direction for setting back the indicating mechanism aforesaid; the clutch roller 61 prevents it from being turned counterclockwise by frictional engagement between said hub 60 and the inclined wall of said recess 62, as shown in Fig. IV. When said shaft 40 is turned clockwise by manipulation of the handle 39 shown in Fig. II, said roller 61 is rolled toward the wide end of the recess 62 so as to release said hub 60.

Said cam 59, which is thus movable only clockwise to the extent of one revolution by the manual operation of said crank 39 during the resetting movement of the dials back to zero position, has the notch 63 in its periphery to normally receive the roller 64 in the position shown in Fig. IV; which corresponds with the zero position of said dials. Said roller is carried by the locking lever 65 which is fulcrumed at 66 in said lock casing 45 and continually stressed downwardly at its end provided with said roller 64, by the plunger 68 under stress of the spring 69 which is mounted in the socket 70 in said casing 45 in which it is retained by the cross pin 71. The opposite end of said locking lever 65 projects over the inner end of the switch control lever 73 which is fulcrumed at 74 in said lock casing 45 and has its outer end provided with the ball socket 75 carried by the screw 76 and secured in adjusted position by the nut 77. Said socket may be vertically adjusted to properly engage the ball end 78 on the link 79 which connects said switch control lever 73 with said hose supporting lever 25.

As above noted, the inner end of said lever 25 connected with the rod 27 must be depressed to close said switch 29 by which the pump motor is energized. Such movement of said lever 25 is only permitted when the inner end of said lever 73 is free to rise from the position shown in Fig. IV. Therefore, when the initial movement of the set-back shaft 40 lifts the roller 64 from the notch 63 in said cam 59, the right hand end of the lever 65 is pressed down and held down by the cam 59 in such position that the inner end of the lever 73 cannot be raised and, consequently, the switch cannot be closed to energize said pump motor. If the switch is closed at the beginning of the set-back operation, said lever 73 is upturned at its inner end to the position indicated in Fig. VI and, if so, the movement of said lever 65 by its roller 64 thrusts the inner end of said lever 73 downwardly to the position shown in Figs. IV and VIII and opens said switch, stopping the motor. Because said switch 29 is thus opened; the operation of the motor cannot be resumed until the shaft 40 and its cam 59 have been manually turned a complete revolution to again permit the roller 64 to drop into the notch 63 under stress of the spring 69, which position of the cam corresponds with the zero position of the indicating mechanism including the dials 31 and 32 shown in Fig. II.

I also find it convenient to employ in association with said locking lever 65 and switch control lever 73 the latch lever 81 which, as shown in both Figs. IV and V, is fulcrumed in said casing 45 on the stud 82 and has at its free end the pin 83 engaging one end of the spring 84 which extends to the pin 85 in said casing 45. The construction and arrangement of said latch lever 81 and spring 84 are such that said spring serves to normally detain said latch lever in either extreme of its range of oscillation indicated by the full lines of the spring and by the dot and dash line radiating from said fulcrum pin 85 in Fig. IV. Said latch lever 81 has the lug 86 projecting therefrom toward the observer in Fig. IV, and including the knob 87 extending between the right hand end of said lever 65 and the left hand end of said lever 73. In the position shown in Fig. IV, said latch lever 81 is stressed by its spring 84 to present the lower edge of said knob 87 over the flange 89 on the back of the inner end of said switch control lever 73 so that said latch lever 81 prevents the movement of said switch control lever 73 to the position in which the switch 29 is closed. However, when said set-back shaft 40 is turned, as above described, and tilts the locking lever 65 by the roller 64, the flange 90 on the right hand end of said lever 65 presses down on the knob 87 of said latch lever 81 to thrust said lug 86 out of engagement with the left hand end of said switch control lever 73 and thus free the latter. However, upward movement of the left hand end of said switch control lever 73 to close the switch is then prevented by the right hand end of said locking lever 65 bearing down upon the left hand end of said lever 73, and the latch lever 81 is held at the left hand extreme of its movement by the spring 84 when the locking lever 65 returns to the position in which its roller 64 is engaged in the notch 63 of said cam 59; until said hose supporting lever 25 is pushed up by the operator at its outer end with the effect of closing said switch 29 and simultaneously raising the left hand end of said switch control lever 73. Such movement of the lever 73 raises the knob 87 until the axis of said spring 84 passes the dead center of the stud 82 and snaps said lug 86 against the left hand end of said lever 73 in readiness to slip over the left hand of and engage and hold down the lever 73 with the switch 29 open, whenever the switch is opened by hanging the hose on the outer end of said lever 25. That is to say; the inclusion of said latch lever 81 in the combination described provides means to automatically secure the switch 29 in its open position after a dispensing operation and until the set-back mechanism is operated to return the indicating mechanism to zero position. However, when the set-back mechanism has been thus operated to restore the indicating mechanism to zero position, the latch lever 81 is in the position shown in Fig. IV in which the switch may be manually closed by uplifting the outer end of the hose supporting lever 25 and with the effect of causing said latch lever to be snapped into its right hand position by the spring 84 ready to engage and hold said lever 73 with the switch in open position after it is opened by returning the hose to its idle position on the outer end of said lever 25.

As above described; there are four positions which the switch locking mechanism shown in Fig. IV successively assumes; to wit, first, the normal initial position preliminary to a dispensing operation, which position is shown in Fig. IV; second, the position shown in Fig. VI to which it is shifted by the manual operation of closing the switch. Third, the position shown in Fig. VII to which it is snapped by the spring 84 when the dispensing operation is terminated by manually hanging the hose on the outer end of said lever 25; and, fourth, the position shown in Fig. VIII consequent upon the initial manual movement of the resetting crank 39 and in which the switch is locked against closure until the indicating mechanism is reset to zero position corresponding with Fig. IV.

However, as above indicated, the operation of the pump motor may be controlled so that it is impossible to initiate a dispensing operation unless and until the indicating mechanism is in its zero position, without the employment of said latch lever 81 and its appurtenances. Therefore, I do not desire to limit myself to the precise details of construction and arrangement herein set forth, as it is obvious that various modifications may be made therein without departing from the essential features of my invention, as defined in the appended claims.

I claim:

1. In liquid dispensing apparatus, the combination with a meter for measuring the volume of liquid dispensed; of a hose; a pump for dispensing liquid through said meter and hose; means for indicating the volume of liquid thus dispensed at each dispensing operation; an electric motor operatively connected with said pump; an electric switch for controlling the operation of said motor and pump; a hose supporting lever connected with said switch; a switch control lever; pivotal connecting means at one end of said switch control lever, adjustable transversely with respect to said lever, by screw means; a link pivotally connected at one end with said hose supporting lever, and pivotally connected at the other end with said transversely adjustable pivotal connecting means on said switch control lever; whereby the relative positions of said hose support and switch control lever may be precisely adjusted; set back mechanism for restoring said indicating mechanism to zero position, including a set back shaft; a cam rigidly connected with said set back shaft and having a notch in its periphery; a casing inclosing said cam; an automatically operative clutch element interposed between said casing and said shaft limiting the rotation of said shaft to the one direction for setting back said indicating means; a locking lever, fulcrumed in said casing, having at one end a roller in cooperative relation with said cam and having its other end overhanging and limiting the movement of said switch control lever; a spring in said casing continually stressing the end of said locking lever carrying said roller toward said cam, whereby said roller is caused to enter said cam notch when the latter is presented in registry therewith; a latch lever fulcrumed at its upper end in said casing and extending transversely with respect to said switch control lever and locking lever; said latch lever having a projecting knob intermediate of its length for cooperation with said switch control lever; and a snap spring extending from the free end of said latch lever across the fulcrum of said latch lever to a point of attachment in said casing; whereby said snap spring holds said latch lever alternately at either extreme of its range of movement, and said switch control lever is only freed from said locking lever when said roller is permitted to enter the notch of said cam by set back movement of said cam to zero position of said indicating means and the consequent movement of said locking lever presses said latch lever out of engagement with said switch control lever.

2. In liquid dispensing apparatus, the combination with a meter for measuring the volume of liquid dispensed; of a hose; a pump for dispensing liquid through said meter and hose; means for indicating the volume of liquid thus dispensed at each dispensing operation; an electric motor operatively connected with said pump; an electric switch for controlling the operation of said motor and pump; a movable hose support connected with said switch; a switch control lever; pivotal connecting means at one end of said switch control lever, adjustable transversely with respect to said lever; a link pivotally connected at one end with said movable hose support, and pivotally connected at the other end with said pivotal connecting means on said switch control lever; whereby the relative positions of said movable hose support and switch control lever may be precisely adjusted; set back mechanism for restoring said indicating mechanism to zero position, including a set back shaft; a cam rigidly connected with said set back shaft and having a notch; a casing inclosing said cam; an automatically operative clutch element limiting the rotation of said shaft to the one direction for setting back said indicating means; a locking lever, having at one end a roller in cooperative relation with said cam and having its other end arranged to limit the movement of said switch control lever; a spring continually stressing said roller toward said cam, whereby said roller is caused to enter said cam notch when the latter is presented in registry therewith; a latch lever fulcrumed at one end and extending transversely with respect to said switch control lever and locking lever; said latch lever having a projection for cooperation with said switch control lever; and a snap spring extending from the free end of said latch lever across the fulcrum of said latch lever to a fixed point; whereby said snap spring holds said latch lever alternately at either extreme of its range of movement, and said switch control lever is only freed from said locking lever when said roller is permitted to enter the notch of said cam, at zero position, and the consequent movement of said locking lever presses said latch lever out of engagement with said switch control lever.

3. In liquid dispensing apparatus, the combination with a meter for measuring the volume of liquid dispensed; of a hose, a pump for dispensing liquid through said meter and hose; means for indicating the volume of liquid thus dispensed at each dispensing operation; an electric motor operatively connected with said pump; an electric switch for controlling the operation of said motor and pump; a movable hose support connected with said switch; a switch control lever; adjustable pivotal connecting means at one end of said switch control lever; a link connected at one end with said movable hose support, and at the other end with said adjustable pivotal connecting means; whereby the relative positions of said movable hose support and switch control lever may be precisely adjusted; set back mechanism for restoring said indicating mechanism to zero position, including a set back shaft; a cam on said set back shaft having a notch in its periphery; a clutch element for automatically limiting the rotation of said shaft to the one direction for setting back said indicating means; a locking lever, fulcrumed intermediate of its length and carrying a roller in cooperative relation with said cam and having a portion limiting the movement of said switch control lever; a spring continually stressing said roller toward said cam, whereby said roller is caused to enter said cam notch when the latter is presented in registry therewith; a latch lever in cooperative relation with both said switch control lever and locking lever; said latch lever having an element for contact with said switch control lever; and spring means for holding said latch lever alternately at either extreme of its range of movement; whereby, said switch control lever is only freed from said locking lever when said roller is permitted to enter the notch of said cam, at zero position, and the consequent movement of said locking lever moves said latch lever out of engagement with said switch control lever.

JOSEPH C. WOODFORD.